(12) United States Patent
Ahn

(10) Patent No.: US 9,490,464 B2
(45) Date of Patent: Nov. 8, 2016

(54) SECONDARY BATTERY

(75) Inventor: Chang-Bum Ahn, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 158 days.

(21) Appl. No.: 13/213,929

(22) Filed: Aug. 19, 2011

(65) Prior Publication Data

US 2012/0082891 A1    Apr. 5, 2012

Related U.S. Application Data

(60) Provisional application No. 61/389,123, filed on Oct. 1, 2010.

(51) Int. Cl.
| | |
|---|---|
| *H01M 2/14* | (2006.01) |
| *H01M 2/18* | (2006.01) |
| *H01M 2/34* | (2006.01) |

(Continued)

(52) U.S. Cl.
CPC ............. *H01M 2/18* (2013.01); *H01M 2/1673* (2013.01); *H01M 2/266* (2013.01); *H01M 2/348* (2013.01); *H01M 4/13* (2013.01); *H01M 10/0436* (2013.01); *H01M 2/1626* (2013.01);

(Continued)

(58) Field of Classification Search
CPC ........ H01M 2/20; H01M 2/22; H01M 2/164; H01M 2/1646; H01M 2/1653; H01M 2/166; H01M 2/1673; H01M 2/168; H01M 10/052; H01M 10/0525; H01M 10/0431; H01M 2220/30; H01M 2/06; H01M 2/065; H01M 2/30; H01M 2/26; H01M 2/263; Y02E 60/122

USPC .......................................................... 429/211
See application file for complete search history.

(56) References Cited

U.S. PATENT DOCUMENTS

| | | |
|---|---|---|
| 5,585,206 A | 12/1996 | Morris |
| 6,335,114 B1 | 1/2002 | Ueshima et al. |

(Continued)

FOREIGN PATENT DOCUMENTS

| | | |
|---|---|---|
| CN | 1767228 A | 5/2006 |
| EP | 2591519 A2 | 5/2003 |

(Continued)

OTHER PUBLICATIONS

European Office Action dated Jun. 5, 2013 issued in connection with corresponding European Patent Application No. 11181930.6-1359, in 5 pages.

(Continued)

*Primary Examiner* — Ula C Ruddock
*Assistant Examiner* — Lisa S Park
(74) *Attorney, Agent, or Firm* — Knobbe Martens Olson & Bear LLP

(57) ABSTRACT

Disclosed are a secondary battery including an electrode assembly which includes a first electrode plate and a second electrode plate arranged as a stack, and a separator interposed between the first electrode plate and the second electrode plate, the first electrode plate including a first active material coating part formed by coating a base with a first active material and a first non-coating part, the second electrode plate including the second active material coating part formed by coating a base with a second active material and a second non-coating part, and the first non-coating part including an insulating member in a portion corresponding to the second electrode plate.

19 Claims, 3 Drawing Sheets

(51) Int. Cl.
*H01M 4/13* (2010.01)
*H01M 2/26* (2006.01)
*H01M 10/04* (2006.01)
*H01M 2/16* (2006.01)

(52) U.S. Cl.
CPC ......... *H01M2/1646* (2013.01); *H01M 2/1653* (2013.01); *H01M 2/1686* (2013.01); *Y02E 60/122* (2013.01)

(56) References Cited

U.S. PATENT DOCUMENTS

| | | | |
|---|---|---|---|
| 2003/0099880 A1 | 5/2003 | Park et al. | |
| 2006/0046137 A1 | 3/2006 | Kodama | |
| 2006/0093897 A1* | 5/2006 | Choi | H01M 2/021 429/62 |
| 2006/0093905 A1* | 5/2006 | Kim | 429/175 |
| 2006/0115722 A1* | 6/2006 | Kim | H01M 2/263 429/161 |
| 2006/0154139 A1 | 7/2006 | Fujikawa et al. | |
| 2007/0134556 A1* | 6/2007 | Sano et al. | 429/247 |
| 2007/0154788 A1* | 7/2007 | Hong et al. | 429/130 |
| 2007/0231701 A1* | 10/2007 | Lee | H01M 2/18 429/246 |
| 2009/0111011 A1* | 4/2009 | Kim | H01M 2/14 429/133 |
| 2009/0253043 A1* | 10/2009 | Bak | 429/246 |
| 2009/0317713 A1 | 12/2009 | Kim et al. | |
| 2010/0035144 A1* | 2/2010 | Oh | H01M 2/021 429/164 |

FOREIGN PATENT DOCUMENTS

| | | |
|---|---|---|
| JP | 05-290826 A | 11/1993 |
| JP | 2000-173657 A | 6/2000 |
| JP | 2001-093583 A | 4/2001 |
| JP | 2002-329493 A | 11/2002 |
| JP | 2003-168417 A | 6/2003 |
| JP | 2004-055537 A | 2/2004 |
| JP | 2004-134116 A | 4/2004 |
| JP | 2005-243526 A | 9/2005 |
| JP | 2006-004777 A | 1/2006 |
| JP | 2006-073243 A | 3/2006 |
| JP | 2006-196248 A | 7/2006 |
| JP | 2007-095656 A | 4/2007 |
| JP | 2008-277238 A | 11/2008 |
| JP | 2010-003692 A | 1/2010 |
| KR | 10-0277638 B1 | 2/2001 |
| KR | 10-0326292 B1 | 3/2002 |
| KR | 10-2003-0042578 A | 6/2003 |
| KR | 2003-0095519 A | 12/2003 |
| KR | 10-2002-00645 42 * | 4/2004 ............ H01M 10/04 |
| KR | 10-2004-0035410 A | 4/2004 |
| KR | 2007-0049553 A | 5/2007 |
| KR | 2007-0087381 A | 8/2007 |
| KR | 10-2008-0018471 A | 2/2008 |
| KR | 10-2008-0040822 A | 5/2008 |

OTHER PUBLICATIONS

Japanese Office Action dated Jun. 18, 2013 issued in connection with corresponding Japanese Patent Application No. 2011-214571, in 3 pages.
Korean Office Action dated Apr. 19, 2013 issued in connection with corresponding Korean Patent Application No. 10-2011-0097002, which claims priorities of the corresponding U.S. Appl. No. 61/389,123 and U.S. Appl. No. 13/213,929, in 16 pages.
Korean Notice of Allowance dated Jan. 3, 2014, issued in connection with corresponding Korean Patent Application No. 10-2011-0097002.
Japanese Decision of Grant dated Feb. 4, 2014, issued in connection with corresponding Japanese Patent Application No. 2011-214571.
Chinese Office Action dated Nov. 1, 2013, issued in connection with corresponding Chinese Patent Application No. 201110294482.2.
Notice of Allowance dated Sep. 1, 2014 issued in corresponding Chinese Patent Application No. 201110294482.2.

* cited by examiner

SECONDARY BATTERY

CROSS-REFERENCE TO RELATED APPLICATIONS

This application claims priority to U.S. Provisional Application No. 61/389,123, filed on Oct. 1, 2010 which is incorporated herein in its entirety.

BACKGROUND

1. Field

The embodiment relates to a secondary battery, and more particularly, to a secondary battery which is improved in safety.

2. Description of the Related Art

Recently, a secondary battery is widely used as a power supply of portable electronic devices.

Further, as portable electronic devices are used in a variety of fields, there is an increasing demand for a high-capacity second battery. Accordingly, extensive studies are being conducted to improve safety of the secondary battery.

SUMMARY

An aspect of the present embodiments is to provide a secondary battery in which a short circuit does not occur at a high temperature.

Further, an aspect of the present embodiments is to provide a secondary battery which facilitates alignment of a positive electrode plate and a negative electrode plate.

According to an aspect of the present embodiments, there is provided a secondary batter including a electrode assembly which includes a first electrode plate and a second electrode plate arranged as a stack, and a separator interposed between the first electrode plate and the second electrode plate, the first electrode plate including a first active material coating part formed by coating a base with a first active material and a first non-coating part, the second electrode plate including the second active material coating part formed by coating a base with a second active material and a second non-coating part, and the first non-coating part including an insulating member in a portion corresponding to the second electrode plate.

The first non-coating part and the second non-coating part are a part which is not coated with the first active material on the first electrode plate and on the second electrode plate and may be formed to extend from the first active material coating part and the second active material coating part, respectively.

The first non-coating part adjacent to the first active material coating part of the first electrode plate may include the insulating member.

The first non-coating part may include the insulating member in a portion corresponding to the second electrode plate.

The insulating member may be provided to cover a front surface and a back surface of the first non-coating part. The insulating member and the first non-coated part of the first electrode plate may have a laminated structure.

The insulating member may be one or more of a cellulose film, a PP film, and a PI film.

The insulating member may further include a ceramic coating layer on the insulating member. Here, the ceramic coating layer may be one or more of Al2O3, BaTiO4, TiO2 and SiO2. Further, the ceramic coating layer may be formed by mixing two materials of Al2O3, BaTiO4, TiO2 and SiO2 at a weight ratio of 7:3 or 5:5. The ceramic coating layer may comprise two of $Al_2O_3$, $BaTiO_4$, $TiO_2$ and $SiO_2$ in a weight ratio of from 7:3, with seven parts of $Al_2O_3$ or $TiO_2$ and three parts $BaTiO_4$ or $SiO_2$, to 1:1

The insulating member may be formed except a tab coupling part.

A thickness of the insulating member may be a thickness of the first active material coating part or less. A portion of the insulating member may be arranged in an area which corresponds to the second active material coated part.

As described above, example embodiments provide a stack-type secondary battery which is stably used at a high temperature.

Moreover, example embodiments provide a stack-type secondary battery which facilitates alignment of a positive electrode plate and a negative electrode plate to improve productivity.

BRIEF DESCRIPTION OF THE DRAWINGS

The accompanying drawings, together with the specification, illustrate example embodiments, and, together with the description, serve to explain the principles of the present embodiments.

DETAILED DESCRIPTION

Figure 1:
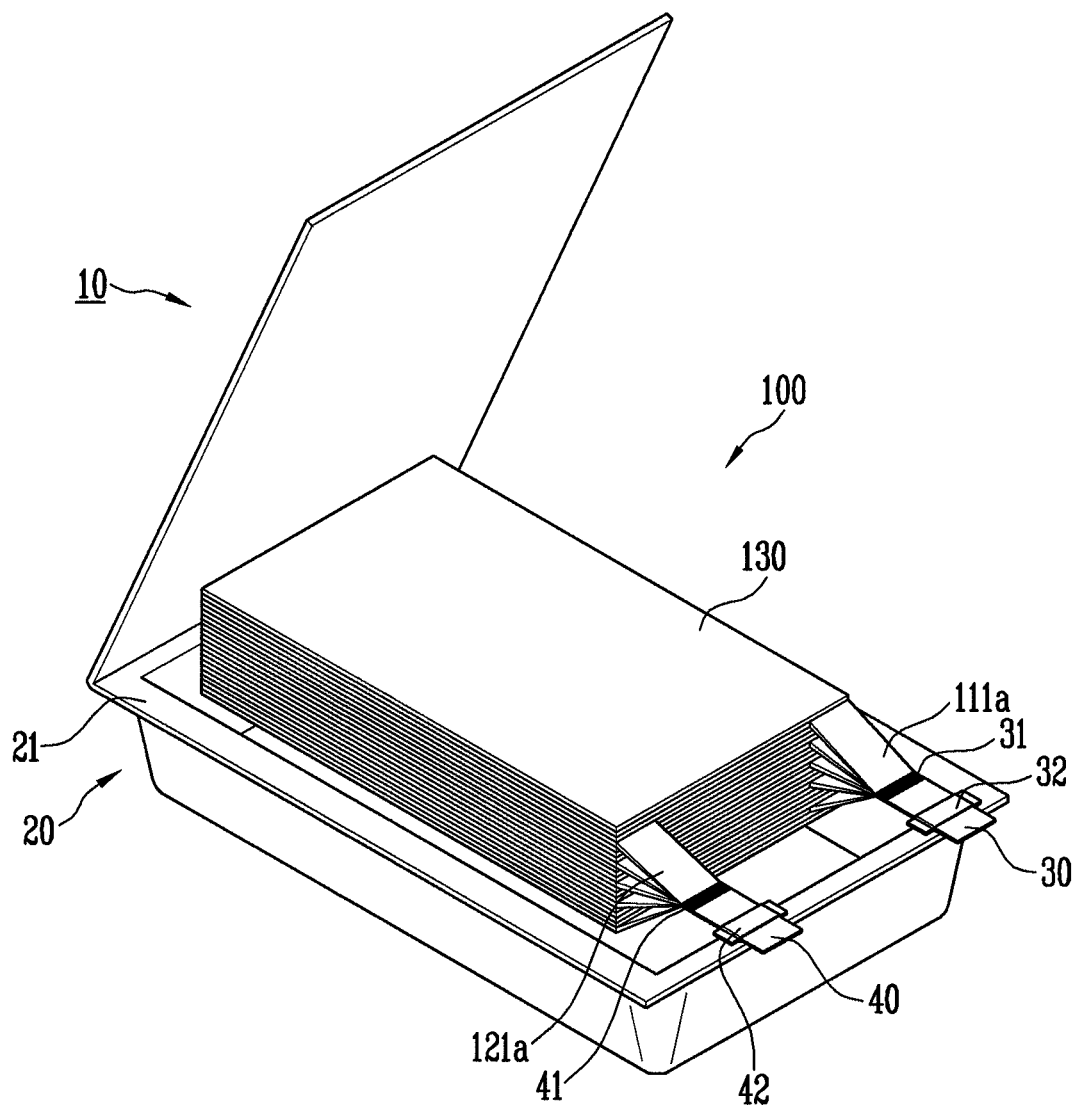
FIG. 1 is an exploded perspective view of a secondary battery according to an example embodiment.

In the following detailed description, only certain example embodiments have been shown and described, simply by way of illustration. As those skilled in the art would realize, the described embodiments may be modified in various different ways, all without departing from the spirit or scope of the present embodiments. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals refer to like elements.

Hereinafter, example embodiment will be described with reference to the accompanying drawings.

Figure 2:
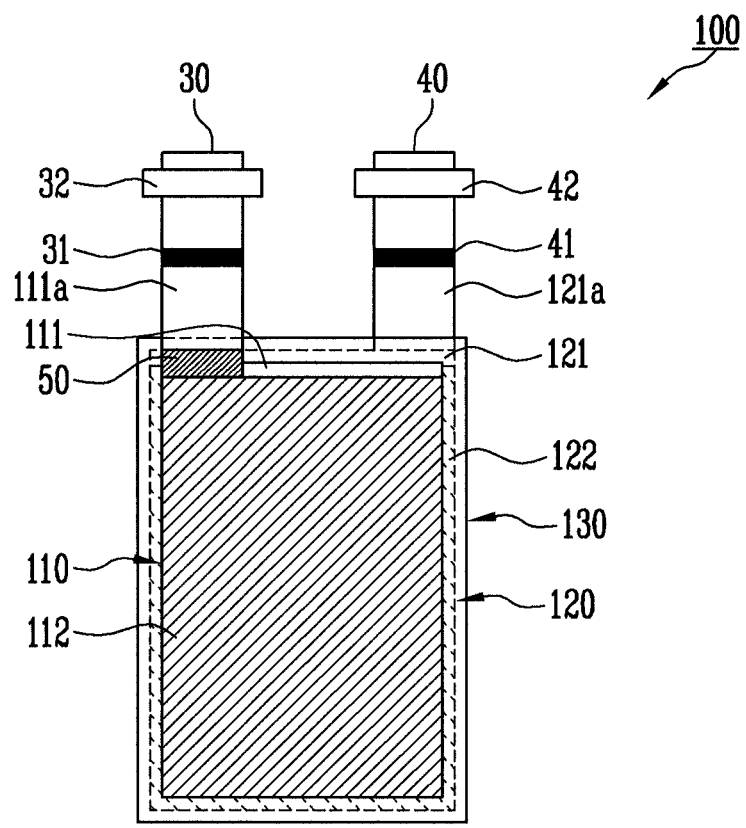
FIG. 2 illustrates an upper side of an electrode assembly of FIG. 1.
Figure 3:
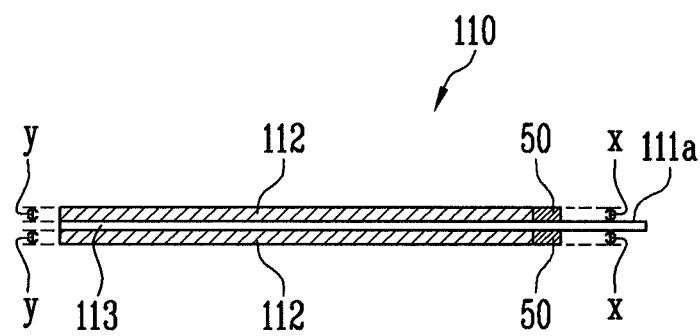
FIG. 3 is a cross-sectional view of a positive electrode plate according to the example embodiment.

FIGS. 1 to 3 illustrate an example embodiment.

FIG. 1 is an exploded perspective view of a stack-type secondary battery according to the example embodiment, and FIG. 2 illustrates an upper side of an electrode assembly of FIG. 1.

The secondary battery 10 according to the present embodiment includes the electrode assembly 100 including a first electrode plate 110 and a second electrode plate 120 arranged as a stack, and a separator 130 interposed between the first electrode plate 110 and the second electrode plate 120, the first electrode plate 110 including a first active material coating part 112 formed by coating a base with a first active material and a first non-coating part 111, the second electrode plate 120 including the second active material coating part 122 formed by coating a base with a second active material and a second non-coating part 121, and the first non-coating part 111 including an insulating member 50 in a portion corresponding to the second electrode plate 120.

The first non-coating part 111 and the second non-coating part 121 are parts which are not coated with an active layer on the first electrode plate 110 and on the second electrode plate 120 and may be formed to extend from the first active material coating part 112 and the second active material coating part 122, respectively. The electrode assembly 100 may further include a first electrode tab 111a and a second electrode tab 121a, and the first electrode tab 111a and the second electrode tab 121a may be drawn out at one side of the electrode assembly 100 and be spaced away from each other.

Referring to FIG. 1, the stack-type secondary battery 10 may be manufactured by accommodating the electrode assembly 100 and an electrolyte (not shown) in a battery case 20.

The battery case 20 includes a body to accommodate the electrode assembly 100 and a cover to cover the body. A sealing part 21 may be provided on an edge of the body. The stack-type secondary battery 10 according to the present embodiment may be manufacture by accommodating the electrode assembly 100 and the electrolyte in the body of the battery case 20, followed by thermal fusion in a state where the body and the cover are stuck.

In the electrode assembly 100, a first electrode lead 30 and a second electrode lead 40 form first and second electrode tabs 111a and 121a and coupling parts 31 and 41, respectively. The first electrode lead 30 and the second electrode lead 40 are drawn out to the outside via the sealing part 21 of the battery case 20 to electrically connect the secondary battery 20 to the outside. Further, the first electrode lead 30 and the second electrode lead 40 may further include a lead film 32 and 42. The lead film 32 and 42 may be provided in a portion where each of the electrode leads 30 and 40 comes in contact with the sealing part 21 of the battery case 20. The lead film 32 and 42 prevents a short circuit between the sealing part 21, and the first electrode lead 30 and the second electrode lead 40 which may occur when the sealing part 21 of the battery case 20 is thermally fused, and also increases adhesion of the sealing part 21 to prevent the electrolyte from leaking out of the battery case 20.

The electrolyte (not shown) accommodated in the battery case 20 may include lithium salts functioning as a supply of lithium ions and a nonaqueous organic solvent as a medium to enable ions involved in an electrochemical reaction to transfer. The first electrode plate 110 and the second electrode plate 120 to constitute the electrode assembly 100 react with the electrolyte to generate electrochemical energy, and the electrochemical energy may be transmitted to the outside through the electrode leads 30 and 40.

Referring to FIG. 1, the electrode assembly 100 according to the present embodiment may be formed by depositing on a substrate a plurality of first electrode plates 100, a plurality of second electrode plates 200, and a plurality of separators 130 interposed between the electrode plates.

FIG. 2 illustrates the upper side of the electrode assembly 100 of FIG. 1. The electrode assembly 100 has a form of depositing a plurality of units, a single unit being constituted by the first electrode plate 110, the second electrode plate 120, and the separator 130 interposed between the electrode plates 110 and 120. In detail, the unit includes one second electrode plate 120, one first electrode plate 110 deposited on the second electrode plate 120, and a separator 130 interposed between the electrode plates 110 and 120. The electrode assembly is manufactured by repeatedly depositing the second electrode plate 120 and the first electrode plate 110 while depositing the separator 130 on the unit. Here, a depositing order of the electrode plates may be changed depending on a design of the electrode assembly 100.

In the present embodiment, the first electrode plate 110 may be a positive electrode plate. The positive electrode plate includes a positive active material coating part 112 formed by coating a base with a positive active material that is the first active material coating part 112, and the non-coating part 111 which is not coated with the positive active material. Generally, the base is not limited as long as it is a high conductive material and does not cause chemical changes. The positive active material forming the positive active material coating part 112 may include a layered compound including lithium.

The second electrode plate 120 may be a negative electrode plate. The negative electrode plate includes a negative active material coating part 122 formed by coating a base with a negative active material that is the first active material coating part 122, and the non-coating part 121 which is not coated with the negative active material. Generally, the base may be metal, and the negative active material forming the negative active material coating part 122 may include graphite or the like.

As described above, the first non-coating part 111 and the second non-coating part 121 are a non-coated part on the positive electrode plate 110 and on the negative electrode plate 120 and may extend from the positive active material coating part 112 and the negative active material coating part 122, respectively. Generally, the first non-coating part 111 and the second non-coating part 121 may be provided to have approximately the same width as the respective active material coating parts 112 and 122 to form an upper part of a rectangle or may be provided to be punched so that one part is protruded, but are not limited thereto.

The positive electrode plate 110 and the negative electrode plate 120 may include the first electrode tab 111a and the second electrode tab 121a which are narrower than the positive and negative active material coating parts 112 and 122, respectively. The first electrode tab 111a and the second electrode tab 121a may be formed by punching one part of the positive electrode plate 110 and the negative electrode plate 120 using a mold. Generally, the first electrode tab 111a and the second electrode tab 121a are formed by punching the first non-coating part 111 and the second non-coating part 121 of the electrode plates. The first electrode tab 111a and the second electrode tab 121a may have various shapes. For example, the first electrode tab 111a and the second electrode tab 121a may have a rectangular shape protruded from the positive and negative active material coating parts 112 and 122, or may be protruded from the first and second non-coating parts 111 and 121. Further, the first electrode tab 111a and the second electrode tab 121a may be attached to one side of the positive electrode plate 110 and the negative electrode plate 120 to be formed on the electrode plates using a separate member. The first electrode tab 111a and the second electrode tab 121a electrically connect the plurality of deposited positive electrode plates 110 and the plurality of deposited negative electrode plates 120 to the same kinds of electrode plates to easily combine with the first and second electrode leads 30 and 40 of the electrode plates, but are not limited thereto.

When the negative active material includes, for example, graphite, the negative electrode plate 120 may generally be formed to have the same area as the positive electrode plate 110 or to have a greater area than the positive electrode plate 110. When the negative electrode plate 120 is formed to have a smaller area than the positive electrode plate 110, lithium included in the positive active material may be extracted in charging and discharging, which reduces capacity of the secondary battery 10 and may cause safety of the secondary battery 10 to drastically deteriorate in charging and discharging. Thus, as shown in FIG. 2, when depositing the positive electrode plate 110 and the negative electrode plate 120, the negative electrode plate 120 may be formed to have a large area as compared with the positive electrode plate 110 in view of the capacity and safety of the secondary battery 10. In addition, the separator 130 interposed between the electrode plates may be formed to have a larger area than the negative electrode plate 120 having a relatively large area in order to prevent a short circuit from occurring between the positive electrode plate 110 and the negative plat 120.

The separator 130 is interposed between the positive electrode plate 110 and the negative electrode plate 120 to prevent a direct contact with each other to short circuit. For example, the separator 130 may comprise a polymer material and use an insulating thin film having a high ion permeability and a high mechanical strength.

When the secondary battery 10 is exposed to a high temperature, the separator 130 comprising a polymer material may generally contract. The contracting separator 130 may be reduced in area smaller than the positive electrode plate 110 and the negative electrode plate 120, and accordingly a portion of the electrode plates may be exposed to short circuit. Here, since the electrode assembly 100 is formed by depositing the positive electrode plate 110 and the negative electrode plate 120 with the separator 130 being interposed between the electrode plates, due to the separator 130 interposed between the electrode plates, it is not easy to deposit the positive electrode plate 110 and the negative electrode plate 120 while aligned properly and facing each other.

Here, the positive electrode plate 110 and the negative electrode plate 120 which have different polarities may come into direct contact with each other to short circuit, in which the first non-coating part 111 of the positive electrode plate 110 is particularly vulnerable to a short circuit since the first non-coating part 111 is positioned at an end portion of the positive electrode plate 110 to be easily in contact with the negative electrode plate 120. Thus, the insulating member 50 may be formed in a portion of the first non-coating part 111 corresponding to the negative electrode plate 120. Further, the insulating member 50 formed on the first non-coating part 111 may be formed adjacently to the positive active material coating part 112. In the positive electrode plate 110 and the negative electrode plate 120, when a short circuit occurs, the positive active material coating part 112 and the negative active material coating part 122 on the respective electrode plates generate substantial heat as compared with the non-coating parts, and may even ignite or explode the secondary battery. The insulting member 50 is deposited to face the negative active material coating part 122 with the separator 130 disposed therebetween in an adjacent portion to the positive active material coating part 112, risk of a short circuit occurring is relatively high in the adjacent portion. When the first non-coating part 111 is punched to form the first electrode tab 111a, at least part of the first electrode tab 111a may face the negative electrode plate 120. Here, the insulating member 50 may be also formed on the first electrode tab 111a to prevent a short circuit from occurring between the electrode plates.

FIG. 3 is a cross-sectional view of the positive electrode plate 110 according to the example embodiment.

Referring to FIG. 3, the positive electrode plate 110 includes the positive active material coating part 112 formed by coating a front surface and a back surface of the base 113 with the positive active material, and the non-coating part 111. The non-coating part 111 may include the insulating member 50, and the insulating member 50 may be formed to cover a front surface and a back surface of the non-coating part 111. Generally, both the front surface and the back surface of the base of the positive electrode plate 110 and the negative electrode plate are formed with a negative active material coating part in order to maximize capacity of the secondary battery 10 per volume. Here, when the insulating member 50 is formed on only one surface of the front surface and the back surface of the non-coating part 111, the other surface where the insulating member 50 is not formed becomes vulnerable to a short circuit when the positive electrode plate 110 and the negative electrode plate 120 face each other. In addition, when the insulating member 50 is formed on only one surface, there may be a difference in thickness between the one surface where the insulating member 50 is formed and the other surface where the insulating member 50 is not formed, which interrupts deposition of the electrode plates.

The thickness of the insulating member 50 $x$ formed on the non-coating part 111 may be a thickness of the positive active material coating part 112 or less. In detail, when the positive active material coating part 112 has a different thickness on the front surface of the base 113 and on the back surface thereof, the thickness of the insulating member 50 $x$ may be determined by a thickness of the positive active material coating part 112 $y$ provided on the same surface as the insulating member 50.

When the thickness of the insulating member 50 $x$ is more than the thickness of the positive active material coating part 112 $y$, an area where the insulating member 50 is formed relatively increases in thickness by a difference in thickness between the insulating member 50 and the positive active material coating part 112. Thus, when depositing a plurality of electrode plates, it is not easy to balance the electrode plates and there may be problems in aligning the deposited electrode plates. Also, since the plurality of electrode plates are deposited, an accumulated thickness of the insulating member 50 formed on each positive electrode plate 110 may interrupt sealing the battery case 20, and accordingly the electrolyte may leak.

Although the thickness of the positive active material coating part 112 $y$ is the same on the front surface of the base 113 and on the back surface thereof in the present embodiment, the thickness y may not be limited thereto but may be different. When the thickness of the positive active material coating part 112 $y$ is different, as described above, the thickness of the insulating member 50 $x$ may be the thickness of the positive active material coating part 112 $y$ formed on the same surface of the base 113 or less.

The insulating member 50 may be an insulating thin film and, for example, use one or more of a cellulose film, a PP film and a PI film.

In the following example embodiments, only different features from the content described with reference to FIGS. 1 to 3 will be described.

Figure 4:
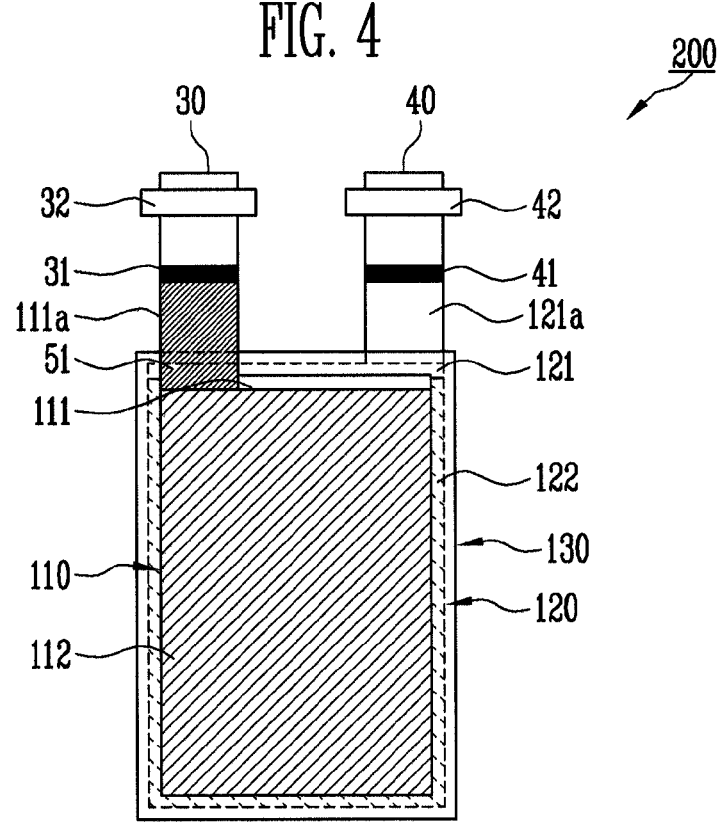
FIG. 4 illustrates an upper side of an electrode assembly according to another example embodiment.

FIG. 4 illustrates an electrode assembly 200 according to another example embodiment.

Referring to FIG. 4, the electrode assembly 200 according to the present embodiment includes a positive electrode plate 110 including a positive active material coating part 112 and a first non-coating part 111, a negative electrode plate 120 including a negative active material coating part 122 and a non-coating part 121, and a separator 130 interposed between the electrode plates, the non-coating part 111 and a first electrode tab 111a including an insulating member 51 in a portion corresponding to the negative electrode plate 120.

The insulating member 51 may be formed to prevent a short circuit with the negative electrode plate 120. Thus, the insulating member 51 may be formed to cover the non-coating part 111 and the first electrode tab 111a overall which have a different polarity from the negative electrode plate 120 and are highly possible to be in contact with the negative electrode plate 120.

Moreover, the first electrode tab 111a may include a coupling part 31. The tab coupling part 31 is a portion where the first electrode tab 111a and a first electrode lead 30 are coupled and may be formed by laser welding or resistance welding. Here, the insulating member 51 may be formed except the tab coupling part 31. When the insulating member 51 is formed on the tab coupling part 31, the insulating member 51 may be damaged when the first electrode lead 30 is coupling with the first electrode tab 111a by welding. Further, the first electrode lead 30 and the first electrode tab 111a are coupled incompletely, so that the first electrode lead 30 may be easily detached from the first electrode tab 111a even by weak impact. Thus, the insulating member 51 is formed to cover the non-coating part 111 and the first electrode 111a overall but is formed except the tab coupling part 31 where the first electrode tab 111a and the first electrode lead 30 are coupled.

Figure 5:
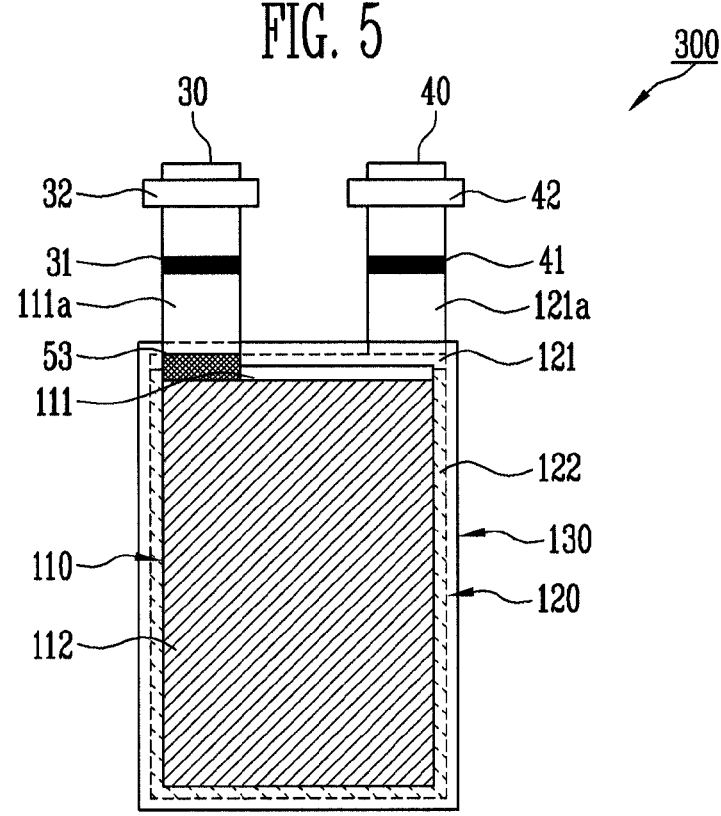
FIG. 5 illustrates an upper side of an electrode assembly according to still another example embodiment.

FIG. 5 illustrates an electrode assembly 300 according to still another example embodiment.

Referring to FIG. 5, the electrode assembly 300 for a secondary battery according to the present embodiment includes a positive electrode plate 110 including a positive active material coating part 112 and a first non-coating part 111, a negative electrode plate 120 being deposited on the positive electrode plate 110 and including a negative active material coating part 122 and a non-coating part 121, and a separator 130 interposed between the electrode plates, the non-coating part 111 including an insulating member 52 further including a ceramic coating layer on the insulating member 52 in a portion corresponding to the negative electrode plate 120. The insulating member 52 and the first non-coated part 111 of the first electrode plate 110 have a laminated structure. A portion of the insulating member is arranged in an area which corresponds to the second active material coated part.

The insulating member 52 including the ceramic coating layer may, for example, be one or more of a cellulose film, a PP film and a PI film and includes an above polymer film and a ceramic coating layer.

For example, the ceramic coating layer may comprise one or more of $Al_2O_3$, $BaTiO_4$, $TiO_2$ and $SiO_2$. The ceramic coating layer may be formed by mixing two materials of $Al_2O_3$, $BaTiO_4$, $TiO_2$ and $SiO_2$ at a weight ratio of 7:3 or 5:5. The ceramic coating layer comprises two of $Al_2O_3$, $BaTiO_4$, $TiO_2$ and $SiO_2$ in a weight ratio of from 7:3, with seven parts of $Al_2O_3$ or $TiO_2$ and three parts $BaTiO_4$ or $SiO_2$, to 1:1

As described above, the insulating member 52 may generally use a polymer film, and the polymer film may be vulnerable to heat. Thus, when a secondary battery using the insulating member 52 is exposed to a high temperature for a long time, the insulating member 52 may contact. However, ceramic hardly charge at a high temperature to be stably used. The insulating member 52 further includes the ceramic coating layer to supplement thermal stability of the insulating member 52 at a high temperature and improve safety of the secondary battery.

Although the spirit of the present embodiments was described in detail in accordance with the example embodiment, it should be understood that the embodiments are provide to explain the present embodiments and do not limit the present embodiments, and various jelly rolls and electrode assemblies having the same may be realized without departing from the scope of the present embodiments.

While the present embodiments have been described in connection with certain example embodiments, it is to be understood that the embodiments are not limited to the disclosed embodiments, but, on the contrary, is intended to cover various modifications and equivalent arrangements included within the spirit and scope of the appended claims, and equivalents thereof.

What is claimed is:

1. A secondary battery comprising:
an electrode assembly comprising a first electrode plate and a second electrode plate arranged as a stack, a separator interposed between the first electrode plate and the second electrode plate, a first electrode tab comprising a first tab coupling part and a first lead film, a second electrode tab comprising a second tab coupling part and a second lead film, and a case,
wherein the first electrode plate comprises a first active material coated part and a first non-coated part within the case;
wherein the second electrode plate comprises a second active material coated part and a second non-coated part within the case;
wherein the first non-coated part comprises an insulating member directly contacting the first active material coated part;
and wherein the insulating member has a total width equal to the total width of the first electrode tab or second electrode tab and a total length smaller than the total length of the first electrode tab or second electrode tab,
wherein the insulating member is between the first active material coated part and the first tab coupling part or between the second active material coated part and the second tab coupling part;
wherein the insulating member is not on the first or second tab coupling part,
wherein the insulating member is between the first active material coated part and the first lead film or between the second active material coated part and the second lead film;
wherein the insulating member is not on the first or second lead film;
wherein the first non-coated part and the second non-coated part extend from the first active material coated part and the second active material coated part, respectively and
wherein the first non-coated part adjacent to the first active material coated part of the first electrode plate comprises the insulating member.

2. The secondary battery of claim 1, wherein the insulating member and the first non-coated part of the first electrode plate have a laminated structure.

3. The secondary battery of claim 1, wherein the insulating member covers a front surface and a back surface of the first non-coated part.

4. The secondary battery of claim 1, wherein the insulating member comprises one or more of a cellulose film, a polypropylene (PP) film, and a polyimide (PI) film.

5. The secondary battery of claim 1, wherein the insulating member further comprises an additional ceramic coating layer on the insulating member.

6. The secondary battery of claim 5, wherein the ceramic coating layer comprises one or more of $Al_2O_3$, $BaTiO_4$, $TiO_2$ and $SiO_2$.

7. The secondary battery of claim 5, wherein the ceramic coating layer is formed by mixing two materials selected from $Al_2O_3$, $BaTiO_4$, $TiO_2$ and $SiO_2$.

8. The secondary battery of claim 7, wherein the two materials are mixed at a weight ratio of from about 7:3 to about 1:1.

9. The secondary battery of claim 1, wherein the thickness of the insulating member is the thickness of the first active material coated part or less.

10. The secondary battery of claim 1, further comprising a first electrode lead and a second electrode lead, wherein the first electrode tab and second electrode tab extend from the first electrode plate and second electrode plate, respectively, and each comprise a tab coupling part, wherein the tab coupling part is a portion where the first electrode tab and the first electrode lead are coupled or second electrode tab and the second electrode lead are coupled.

11. The secondary battery of claim 10, wherein the insulating member is further formed on the first electrode tab.

12. The secondary battery of claim 11, wherein the insulating member is formed on a portion that does not include the tab coupling part.

13. The secondary battery of claim 10, wherein the first electrode plate comprises a positive electrode plate and the second electrode plate comprises a negative electrode plate, wherein the first electrode tab comprises a positive electrode tab, wherein the second electrode tab comprises a negative electrode tab, wherein the first electrode lead comprises a positive electrode lead and wherein the second electrode lead comprises a negative electrode lead.

14. The secondary battery of claim 1, wherein the second electrode plate comprises the same area of the first electrode plate or greater.

15. The secondary battery of claim 10, wherein the width of the first and second electrode tabs is narrower than the width of the first and second electrode plates, respectively.

16. The secondary battery of claim 10, further comprising a lead film on at least one of the first electrode lead and the second electrode lead.

17. The secondary battery of claim 1, wherein a portion of the insulating member is arranged in an area which corresponds to the second active material coated part.

18. The secondary battery of claim 8, wherein the ceramic coating layer comprises two of $Al_2O_3$, $BaTiO_4$, $TiO_2$ and $SiO_2$ in a weight ratio of from 7:3, with seven parts of $Al_2O_3$ or $TiO_2$ and three parts $BaTiO_4$ or $SiO_2$, to 1:1.

19. The secondary battery of claim 1, wherein the insulating member contacts the first active material coated part without overlapping.

* * * * *